3,713,773
METHOD OF DETERMINING TRACE
AMOUNTS OF GASES
Arthur Fontijn, Princeton, N.J., and Pieter H. Vree, Croton-on-Hudson, N.Y., assignors to Aerochem Research Laboratories, Inc.
Continuation-in-part of application Ser. No. 663,369, Aug. 25, 1967. This application Nov. 9, 1970, Ser. No. 87,747
Int. Cl. G01n 27/70
U.S. Cl. 23—232 R
19 Claims

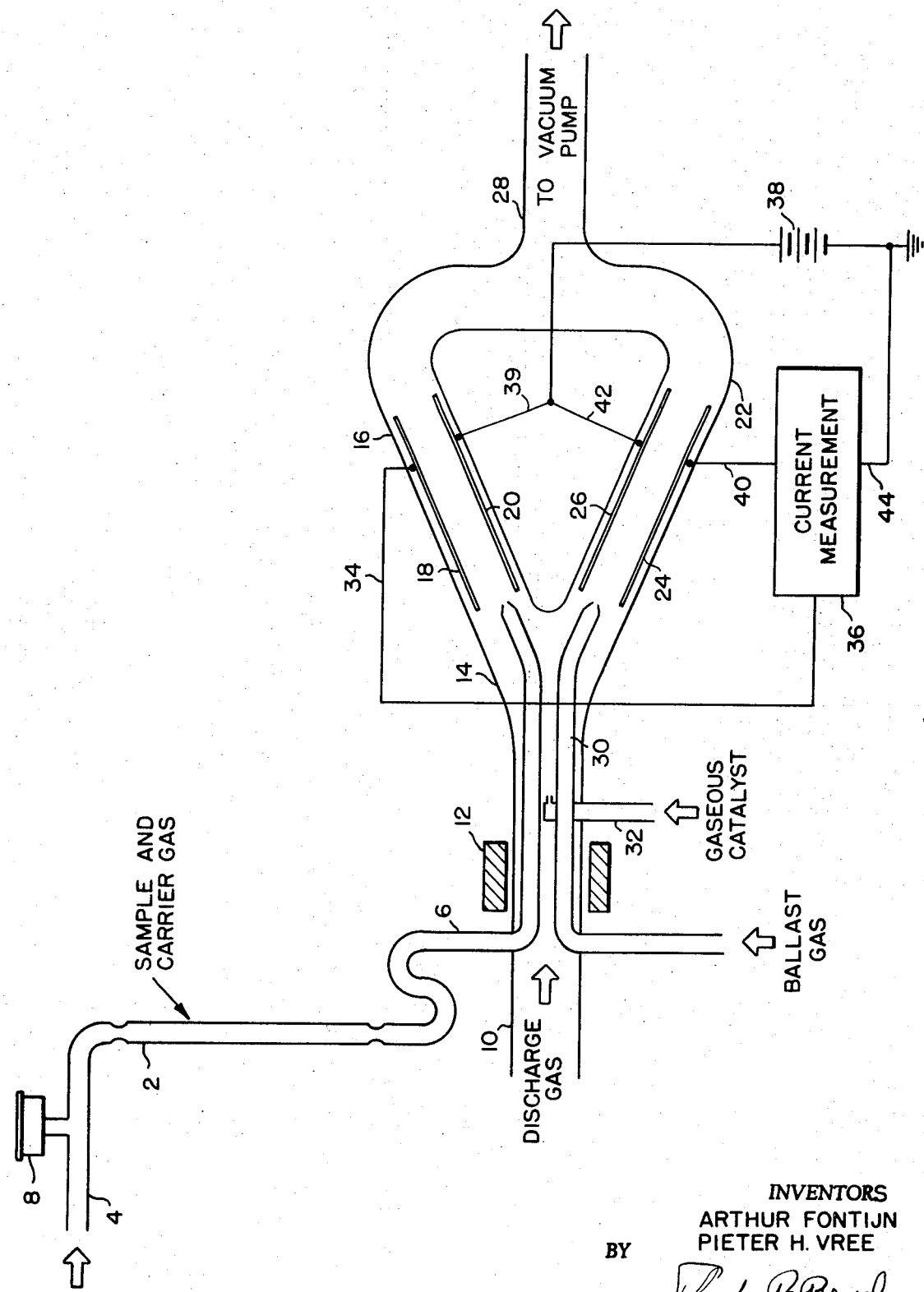

ABSTRACT OF THE DISCLOSURE

Method of detecting trace amounts of volatile substances such as carbon oxides, nitrogen oxides, sulfur oxides and oxygen, comprising taking a measured sample of the gaseous mixture containing the gas to be detected, separating the gas being detected from the mixture where necessary, forming a first component which includes the gas being detected and, preferably, a carrier gas, providing a second component which contains a substance to be reacted with the first component to produce chemi-ions, activating at least one of the substances to produce the species necessary to form chemi-ions, mixing the components to form the chemi-ions, passing the mixture between electrodes and measuring an electrical current produced by the chemi-ions formed.

CROSS-REFERENCE TO RELATED APPLICATIONS

This application is a continuation-in-part of our co-pending application Ser. No. 663,369, filed Aug. 25, 1967, and now U.S. Pat. No. 3,540,851 issued Nov. 17, 1970.

BACKGROUND OF THE INVENTION

Growing interest in the study and control of air pollution has focused attention on methods of analyzing samples of air for as little as one part per billion of various substances commonly present in air as impurities. These substances include such things as pollen, dust of various kinds, acids, alkalies and also gases and vapors of various types such as hydrocarbon compounds, nitrogen oxides, carbon oxides, sulfur oxides and ozone.

There are satisfactory methods of analysis for very small amounts of some of the gases such as hydrocarbon compounds. But, in the case of nitrogen oxides, carbon oxides, sulfur oxides and ozone, although there are generally useful methods of analysis, these are not suited for rapidly and routinely detecting and quantitatively measuring quantities as low as, say, one part per billion.

One well known method of analyzing the contents of a gaseous mixture is to use a gas chromatographic column to separate the components of the mixture and then to measure the amounts of each constituent with an apparatus such as a thermal conductivity cell, a thermistor cell, a microcoulometric unit, or an argon ionization detector. These measuring means are not sensitive enough, however, to analyze the gases of most interest in this invention in the parts per billion range.

The helium ionization detector has been reported in the literature, however, which is said to be accurate in the parts per billion range, for detecting oxygen, argon, nitrogen, carbon monoxide, carbon dioxide and some other gases. This apparatus is not as adaptable to routine analyses as desired and it has certain difficulties in its maintenance. Moreover, its operation is affected by the presence of certain impurities present in the carrier gas. Recent reports indicate that some further analytical methods, specific for one or two oxides only, are now available with sensitivities better than one part per million. Other methods currently in use depend on some device to increase the concentration of the measured gas in the sample and are time-consuming and subject to errors due to the necessary additional handling of the gas.

OBJECTS OF THE INVENTION

A principal object of the present invention is to provide an improved method of detecting volatile substances such as carbon oxides, nitrogen oxides, sulfur oxides and oxygen in a rapid and routine manner, with a sensitivity of a few parts per billion.

SUMMARY OF THE INVENTION

The invention comprises an improved method of determining trace amounts of a volatile substance such as an oxide of carbon, nitrogen or sulfur, or of oxygen alone, by the steps of:

(a) If the gas being determined is in a mixture in which interfering substances are present, first separating the gas to be determined from the mixture;

(b) forming a first component comprising a gaseous stream composed of the gas being detected, which may or may not be mixed with a carrier gas;

(c) providing a second component which contains a substance to be reacted with the first component;

(d) activating at least one of the substances to produce the species necessary to form chemi-ions;

(e) mixing the components so as to form the chemi-ions;

(f) measuring an electrical current produced by the chemi-ions formed.

The electrical current, calibrated against a standard, is directly related to the concentration of the substance being detected.

The physico-chemical principle on which the method of the present invention is based is the production of chemi-ions in reactions of activated species. By activated species is meant a substance to which additional energy has been imparted to convert it to a more reactive, gaseous form. Typical activated species are oxygen atoms, nitrogen atoms, hydrogen atoms, halogen atoms, hydroxyl radicals, excited nitrogen molecules, excited nitrogen atoms, excited oxygen atoms and ozone. The volatile substance to be detected and/or the substance in the second component may be activated, i.e. converted at least partially into activated species, by any one of several known methods. For example, they can be activated by electrical discharge methods, thermal methods, or photochemical methods, as described, for example, in an article "The Production, Detection and Estimation of Atoms in the Gas Phase" by K. R. Jennings, Quarterly Reviews, vol. 15, p. 237 (1961).

The method of this invention can conveniently be used to analyze the output of a gas chromatography, but can equally as well be used in a continuous analyzer of a substance to be detected. The preferred embodiment includes a pair of electrodes placed in the gas flow downstream from an activator. Between the discharge and the electrodes the gas to be analyzed flows into a second gas stream, thus producing chemi-ions. In some cases, the gas to be analyzed will directly form the products which are needed to produce the ions; in other cases the gas to be analyzed must be activated to produce the necessary ion precursors.

Although some embodiments of the present method employ an electrical discharge, they are not discharge detectors. In discharge detectors a change in electrical properties between the electrodes maintaining the discharge is observed when the sample passes through. In the present afterglow ionization detection method, the non-ionic, long-lived discharge products are used to produce ions downstream from the discharge, where the discharge ionization is no longer detectable.

DESCRIPTION OF THE DRAWINGS

The single figure is a schematic diagram of an apparatus suitable for carrying out the method of the invention.

Referring now to the drawing, the apparatus comprises a chromatographic gas separation column 2 of conventional type, having an inlet tube 4 connected to one end and an outlet tube 6 connected to the opposite end. A sample-injecting inlet port 8 is connected to the inlet tube 4. The outlet tube 6 leads into the measuring apparatus which will now be described.

The measuring apparatus includes a discharge gas inlet tube 10 passing through a microwave cavity 12, cf conventional design, to a Y-shaped gas divider unit 14. One leg of the Y comprises a sample arm tube 16 containing a pair of electrodes 18 and 20. The other leg of the Y comprises a reference arm tube 22, also containing a pair of electrodes 24 and 26. Both the sample arm tube 16 and the reference arm tube 22 are joined at their outlet ends to a line 28 leading to a vacuum pump (not shown).

Connected into the sample arm tube 16 is a continuation of the outlet tube 6 from the gas chromatograph column 2. Connected into the reference arm tube 22 is a tube 30 from a source of ballast gas (not shown). This last-mentioned tube 30 first passes through the microwave cavity 12 as does the tube 6.

Also connected to the gas discharge inlet tube 10 may be another tube 32 for introducing a gaseous catalyst in a modification of the invention.

One of the electrodes 18 in the sample arm 16 is connected by a lead 34 to a current-measuring device 36 such as a vibrating reed electrometer. The other electrode 20 in the sample arm 16 is connected to one side, e.g., the positive side, of a battery 38 by a lead 39. One of the electrodes 24, in the reference arm 22, is also connected to the current-measuring device 36 by a lead 40. The other electrode 26, in the reference arm 22, is connected to the same side of the battery 38 as is electrode 20 by a lead 42. The other (negative) side of the battery 38 is connected to ground. The current-measuring device 36 also has a terminal 44 connected to ground.

EXAMPLES

The following is a first example of how to use the apparatus in carrying out the method of the invention in detecting nitric oxide (NO). First, a flow of carrier gas, e.g., helium, is started through the inlet tube 4 and through the chromatograph column 2 to establish equilibrium conditions. At about the same time, a flow of ballast gas, also helium, is started through the ballast gas inlet tube 30 and into the reference arm 22 of the measuring apparatus, and a mixture of nitrogen and helium containing about one volume percent nitrogen is passed into the discharge gas tube 10. Meanwhile, the vacuum pump is also started to establish a vacuum of about 1 mm. of Hg in the sample arm 16 and the reference arm 22. Then the microwave cavity 12 is energized. This causes the gaseous molecules to be broken down into atoms:

$$N_2 \rightarrow N+N$$

The flow rate of the nitrogen-helium mixture is about 1 cc./second.

A 1 cc. sample of the gas mixture which contains the NO to be measured is then injected into the sample injection port 8 and permitted to flow through the gas chromatograph column 2. It is assumed that previous test runs have been made to determine the exact time interval it will take for the NO to appear at the exit end of the column. In the apparatus shown, the sample is passed through the microwave cavity to produce the oxygen atoms needed for the production of ions. However NO does not need to be activated in order to obtain a measurement of its concentration (see Example No. 2, below).

The current measurement apparatus 36 includes a conventional electrometer connected to a recorder. When the atoms from the NO of the injected sample pass through the sample arm 16, a peak will be observed in the recorded reading of the electrometer. The reason for the appearance of the peak is that in mixtures of nitrogen atoms and oxygen atoms, ions are produced by reactions involving excited $N_2$ and/or excited NO molecules in reactions such as:

$$N_2^* + NO^* \rightarrow N_2 + NO^+ + e^-$$
$$N + N + NO^* \rightarrow N_2 + NO^+ + e^-$$

in which $N_2^*$ and $NO^*$ are excited molecules formed by N—N and N—O atom-association reactions.

The area under the peak of the recorded curve is measured to give a relative measurement of the concentration of NO in the sample. To get an actual reading of concentration, this value must be compared with the area under a peak recorded with a known sample of NO. The relative values are different for each apparatus set-up.

The method of this example can also be used to detect any other gas that, when subjected to an electrical discharge, produces oxygen atoms. Examples of such other gases are: sulfur oxides, carbon oxides, nitrogen oxides, molecular oxygen, and other volatile oxides. All of these gases may be activated by electrical discharge methods according to a variety of known techniques. Some of them may also be activated by other methods. For example, oxygen atoms can be produced by passing molecular oxygen over a hot rhenium wire or a Nernst glower. Photochemical methods are also suitable for producing atoms.

In general, the methods of the invention can be used to detect other substances which are not gaseous at ordinary room temperature if the temperature is raised sufficiently to vaporize them. Examples of such substances are $As_2O_3$, $P_2O_3$ and $P_2O_5$.

A second example of how to carry out the method of the invention involves activating only the substance in the second component. The volatile substance being measured is not activated. In this embodiment of the method, nitric oxide can be detected as follows.

A measured sample of a sample stream containing NO is obtained as in the previous example. Also, as in the first example, a mixture of nitrogen and helium containing about one volume percent of nitrogen is passed through the energized microwave discharge cavity (or other activator) to produce nitrogen atoms. The nitrogen atoms and the nitric oxide of the sample stream react as follows:

$$N + NO \rightarrow N_2 + O$$

and the nitrogen atom and oxygen atom mixture thus formed produce ions in the same manner as in the first example.

It will be noted that, in this example, the sample being detected reacts with the second component to produce the ion precursors and the chemi-ions. The method of this example can be used to detect any volatile substance that reacts with nitrogen atoms to produce oxygen atoms. Examples of such substances are nitric oxide, nitrogen dioxide and ozone.

A third example of the method involves detecting a sample of a substance that reacts directly with the second component to produce chemi-ions. In this example, a sample of cesium vapor, which may or may not be carried in an inert carrier gas, such as helium, is reacted with a stream of nitrogen gas that has previously been activated. The results may be represented by reactions such as:

$$N + N + Cs \rightarrow N_2 + Cs^+ + e^-$$
$$N_2^* + Cs \rightarrow N_2 + Cs^+ + e^-$$

$N_2^*$ is an excited molecule formed by atom-association reaction or directly from $N_2$ in the activator. Other substances that can be detected by the method of this example are those substances that can react directly with activated nitrogen to produce ions; for example, lead, barium and sodium atoms.

In Example 4 of the method, a different second component is illustrated. Here, the sample being detected, which may be carbon dioxide, for example, may be passed through a gas chromatographic column, as in Example 1, and then passed through an activator to produce a reaction that may be represented as:

$$CO_2 \rightarrow CO + O$$

and the products reacted with the second component, which in this case is acetylene ($C_2H_2$) which may or may not be mixed with an inert carrier gas, such as helium, in about the same volume proportions as the nitrogen and helium of Example 1. The reaction which occurs is believed to be:

$$O + C_2H_2 \rightarrow CH \text{ plus products}$$
$$CH + O \rightarrow CHO^+ + e$$

As discussed in the first example, any substance that produces oxygen atoms in an activator, can be used in this example. Examples of specific substances that can be determined are the same as in the first example.

In the method as described in Examples 1 and 2, the limit of detectability can be increased by the use of an additive that is capable of reacting with nitrogen atoms to form CN. Examples of such additives are $C_2N_2$, $C_2F_4$, $C_2H_2$, $C_2H_4$ or other small organic molecules that contain one or more unsaturated carbon to carbon bonds.

We claim:

1. A method of determining trace amounts of a volatile substance comprising:
   (a) providing a sample which includes said substance in a gaseous form;
   (b) forming a first component comprising a gaseous stream including said sample, which component may or may not include a carrier gas;
   (c) providing a second component which contains a substance to be reacted with said first component;
   (d) activating at least one of said substances;
   (e) mixing said components downstream from the activating means to form chemi-ions; and
   (f) measuring an electrical current produced by said chemi-ions as a measure of the amount of said volatile substance.

2. A method according to claim 1 in which said first component includes a carrier gas.

3. A method according to claim 1 in which only said substance in said second component is activated.

4. A method according to claim 3 in which the substance being determined is nitric oxide.

5. A method according to claim 3 in which the substance being determined is nitrogen dioxide.

6. A method according to claim 3 in which the substance being determined is ozone.

7. A method according to claim 3 in which said second component comprises nitrogen and an additive that reacts with nitrogen atoms to form CN.

8. A method according to claim 1 in which only said volatile substance in said first component is activated.

9. A method according to claim 8 in which the substance being determined is a carbon oxide.

10. A method according to claim 8 in which the substance being determined is an oxide of sulfur.

11. A method according to claim 8 in which the substance being determined is an oxide of nitrogen.

12. A method according to claim 8 in which the substance being determined is molecular oxygen.

13. A method according to claim 1 in which both of said substances are activated.

14. A method according to claim 13 in which the substance being determined is a carbon oxide.

15. A method according to claim 13 in which the substance being determined is an oxide of sulfur.

16. A method according to claim 13 in which the substance being determined is an oxide of nitrogen.

17. A method according to claim 13 in which the substance being determined is molecular oxygen.

18. A method according to claim 13 in which said second component comprises nitrogen and an additive that reacts with nitrogen atoms to form CN.

19. A method of measuring the percentage of nitric oxide in a gaseous mixture comprising:
   (a) taking a small measured sample of said gaseous mixture;
   (b) separating the nitric oxide being measured from said sample;
   (c) forming a first component which consists essentially of said separated nitric oxide and an inert carrier gas;
   (d) forming a second component which consists essentially of nitrogen and an inert carrier gas;
   (e) activating said nitrogen;
   (f) then mixing said first and second components whereby said activated nitrogen reacts with said nitric oxide to produce chemi-ions, and
   (g) measuring an electrical current produced by said ions as a measure of the amount of said nitric oxide present in said gaseous mixture.

References Cited

Herron et al.: J. Chem. Phys. 30, No. 4, April 1959, pp. 879–885.

MORRIS O. WOLK, Primary Examiner

R. M. REESE, Assistant Examiner

U.S. Cl. X.R.

23—254 R; 204—312; 250—83.6 FT; 324—33